(12) United States Patent
Nomura

(10) Patent No.: US 6,233,521 B1
(45) Date of Patent: May 15, 2001

(54) MAP DATABASE APPARATUS

(75) Inventor: Takashi Nomura, Chigasaki (JP)

(73) Assignee: Xanavi Informatics Corporation, Zama (JP)

( * ) Notice: Subject to any disclaimer, the term of this patent is extended or adjusted under 35 U.S.C. 154(b) by 0 days.

(21) Appl. No.: 09/335,774

(22) Filed: Jun. 18, 1999

Related U.S. Application Data

(63) Continuation of application No. PCT/JP97/04670, filed on Dec. 18, 1997.

(30) Foreign Application Priority Data

Dec. 18, 1996 (JP) .................................................. 8-338716

(51) Int. Cl.$^7$ .................................................. G06F 165/00
(52) U.S. Cl. .......................... 701/208; 701/200; 701/209; 340/990; 340/998
(58) Field of Search .................................. 701/208, 209, 701/212, 211, 200; 340/998, 990, 995; 73/178 R

(56) References Cited

U.S. PATENT DOCUMENTS 5,513,110 * 4/1996 Fujita et al. ........................ 701/207

FOREIGN PATENT DOCUMENTS

| | | |
|---|---|---|
| 63-136272 | 6/1988 | (JP) . |
| 4-313786 | 11/1992 | (JP) . |
| 4-353680 | 12/1992 | (JP) . |
| 7-28980 | 1/1995 | (JP) . |
| 7-37073 | 2/1995 | (JP) . |
| 7-110238 | 4/1995 | (JP) . |
| 7-271966 | 10/1995 | (JP) . |

* cited by examiner

Primary Examiner—William A. Cuchlinski, Jr.
Assistant Examiner—Arthur D. Donnelly
(74) Attorney, Agent, or Firm—Evenson, McKeown, Edwards & Lenahan, P.L.L.C.

(57) ABSTRACT

A map database apparatus is provided in which: meshes that are achieved by dividing a map into a plurality of portions are used as management units; sets of data related to the meshes are stored in a specific order; a management table that manages the sets of data related to the meshes is provided; and the management table has a parameter that makes it possible to determine an access address of a set of data related to a mesh present in a surrounding area of a specific mesh through calculation based upon the specific mesh.

7 Claims, 14 Drawing Sheets

MESH MANAGEMENT UNIT:
GROUP OF 25 LEVEL 5
MESHES

FIG.2A 

MESH MANAGEMENT UNIT:
GROUP OF 16 LEVEL 4
MESHES

FIG.2B 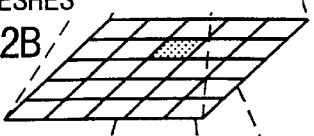

MESH MANAGEMENT UNIT:
GROUP OF 16 LEVEL 3
MESHES

FIG.2C

MESH MANAGEMENT UNIT:
GROUP OF 16 LEVEL 2
MESHES

FIG.2D 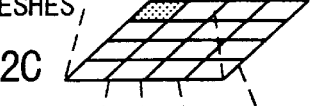

MESH MANAGEMENT UNIT:
GROUP OF 16 LEVEL 1
MESHES

FIG.2E 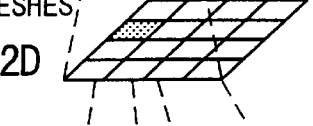

MESH MANAGEMENT UNIT:
GROUP OF 16 LEVEL 0
MESHES

FIG.2F 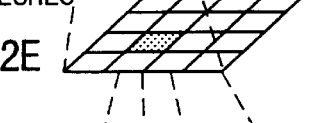

FIG.2G 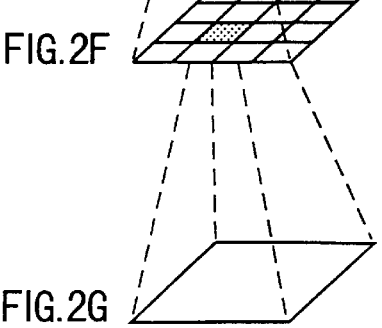

LEVEL 6:

| BLOCK MANAGEMENT UNIT | 40×40=1600 PRIMARY MESHES |
|---|---|
| MESH MANAGEMENT UNIT | 1600 PRIMARY MESHES |
| NUMBER OF MESHES FOR MANAGEMENT | 1 |
| NUMBER OF BLOCKS FOR MANAGEMENT | 1 (THE ENTIRE COUNTRY OF JAPAN) |

LEVEL 5:

| BLOCK MANAGEMENT UNIT | 40×40=1600 PRIMARY MESHES |
|---|---|
| MESH MANAGEMENT UNIT | 64 PRIMARY MESHES |
| NUMBER OF MESHES FOR MANAGEMENT | 25 |
| NUMBER OF BLOCKS FOR MANAGEMENT | 1 (THE ENTIRE COUNTRY OF JAPAN) |

LEVEL 4:

| BLOCK MANAGEMENT UNIT | 40×40=1600 PRIMARY MESHES |
|---|---|
| MESH MANAGEMENT UNIT | 4 PRIMARY MESHES |
| NUMBER OF MESHES FOR MANAGEMENT | 400 |
| NUMBER OF BLOCKS FOR MANAGEMENT | 1 (THE ENTIRE COUNTRY OF JAPAN) |

LEVEL 3:

| BLOCK MANAGEMENT UNIT | 8×8=64 PRIMARY MESHES |
|---|---|
| MESH MANAGEMENT UNIT | 1/4 PRIMARY MESHES |
| NUMBER OF MESHES FOR MANAGEMENT | 256 |
| NUMBER OF BLOCKS FOR MANAGEMENT | 9 (THE ENTIRE COUNTRY OF JAPAN) |

LEVEL 2:

| BLOCK MANAGEMENT UNIT | 4×4=16 PRIMARY MESHES |
|---|---|
| MESH MANAGEMENT UNIT | ONE FACTOR 2 MESHES |
| NUMBER OF MESHES FOR MANAGEMENT | 1024 |
| NUMBER OF BLOCKS FOR MANAGEMENT | 9×4=36 (THE ENTIRE COUNTRY OF JAPAN) |

LEVEL 1:

| BLOCK MANAGEMENT UNIT | ONE PRIMARY MESHES |
|---|---|
| MESH MANAGEMENT UNIT | ONE FACTOR 2.5 MESH (1/16 FACTOR 2 MESH) |
| NUMBER OF MESHES FOR MANAGEMENT UNIT | 1024 |
| NUMBER OF BLOCKS FOR MANAGEMENT | 9×4×16=576 (THE ENTIRE COUNTRY OF JAPAN) |

LEVEL 0:

| BLOCK MANAGEMENT UNIT | 2×2=4 (FACTOR 2 MESHES) |
|---|---|
| MESH MANAGEMENT UNIT | ONE FACTOR 3.5 MESH (1/256 FACTOR 2 MESH) |
| NUMBER OF MESHES FOR MANAGEMENT | 1024 |
| NUMBER OF BLOCKS FOR MANAGEMENT | 9×4×16×16=9216 (THE ENTIRE COUNTRY OF JAPAN) |

BLOCK 1: AREA AROUND TOKYO
BLOCK 2: CHUGOKU, SHIKOKU AREA
BLOCK 3: TOHOKU AREA
BLOCK 4: AREA AROUND NEMURO, HOKKAIDO
BLOCK 5: AREA AROUND SHIRETOKO PENINSULA, HOKKAIDO
BLOCK 6: AREA AROUND WAKKANAI, HOKKAIDO
BLOCK 7: AREA AROUND KAGOSHIMA, KYUSHU
BLOCK 8: AREA AROUND OKINAWA MAIN ISLAND
BLOCK 9: AREA AROUND ISHIGAKIJIMA

FIG. 5

LEVEL X DATA

BLOCK MANAGEMENT TABLE
- BLOCK 1
- BLOCK 2
- ⋮
- BLOCK n

BLOCK 1
- MESH MANAGEMENT TABLE
- MESH DATA
- MESH DATA
- ⋮
- MESH DATA

BLOCK 2
- MESH MANAGEMENT TABLE
- MESH DATA
- MESH DATA
- ⋮
- MESH DATA

BLOCK n
- MESH MANAGEMENT TABLE
- MESH DATA
- MESH DATA
- ⋮
- MESH DATA

FIG. 6
BLOCK MANAGEMENT TABLE AT LEVEL 3

| ITEM NO. | ITEM | | OFFSET | DATA FORMAT | DATA LENGTH (Word) | REMARKS |
|---|---|---|---|---|---|---|
| 1 | BLOCK MANAGEMENT TABLE SIZE | | 0 | BINARY | 1 | |
| 2 | NUMBER OF SETS OF BLOCK MANAGEMENT INFORMATION (UP TO 9 BLOCKS) | | 1 | ↑ | 1 | |
| 3 | BLOCK 1 | UPPER END LATITUDE (PRIMARY LATITUDE MESH CODE) | 2 | ↑ | 1 | |
| 4 | | LOWER END LATITUDE (PRIMARY LATITUDE MESH CODE) | 3 | ↑ | 1 | |
| 5 | | LEFT END LONGITUDE (PRIMARY LONGITUDE MESH CODE) | 4 | ↑ | 1 | |
| 6 | | RIGHT END LONGITUDE (PRIMARY LONGITUDE MESH CODE) | 5 | ↑ | 1 | |
| 7 | | POINTER TO MESH MANAGEMENT TABLE | 6 | SA | 2 | (NOTE 1) |
| 8 | BLOCK 2 | UPPER END LATITUDE (PRIMARY LATITUDE MESH CODE) | 8 | BINARY | 1 | |
| 9 | | LOWER END LATITUDE (PRIMARY LATITUDE MESH CODE) | 9 | ↑ | 1 | |
| 10 | | LEFT END LONGITUDE (PRIMARY LONGITUDE MESH CODE) | 10 | ↑ | 1 | |
| 11 | | RIGHT END LONGITUDE (PRIMARY LONGITUDE MESH CODE) | 11 | ↑ | 1 | |
| 12 | | POINTER TO MESH MANAGEMENT TABLE | 12 | SA | 2 | |
| 13 | BLOCK 3 | UPPER END LATITUDE (PRIMARY LATITUDE MESH CODE) | 14 | BINARY | 1 | |
| 14 | | LOWER END LATITUDE (PRIMARY LATITUDE MESH CODE) | 15 | ↑ | 1 | |
| 15 | | LEFT END LONGITUDE (PRIMARY LONGITUDE MESH CODE) | 16 | ↑ | 1 | |
| 16 | | RIGHT END LONGITUDE (PRIMARY LONGITUDE MESH CODE) | 17 | ↑ | 1 | |
| 17 | | POINTER TO MESH MANAGEMENT TABLE | 18 | SA | 2 | |
| 18 | ⋮ | | | | | |
| 19 | BLOCK 9 | UPPER END LATITUDE (PRIMARY LATITUDE MESH CODE) | 50 | BINARY | 1 | |
| 20 | | LOWER END LATITUDE (PRIMARY LATITUDE MESH CODE) | 51 | ↑ | 1 | |
| 21 | | LEFT END LONGITUDE (PRIMARY LONGITUDE MESH CODE) | 52 | ↑ | 1 | |
| 22 | | RIGHT END LONGITUDE (PRIMARY LONGITUDE MESH CODE) | 53 | ↑ | 1 | |
| 23 | | POINTER TO MESH MANAGEMENT TABLE | 54 | SA | 2 | |

(NOTE 1) SA INDICATES SECTOR ADDRESS ON THE CD-ROM (BINARY DATA FORMAT)

FIG. 7

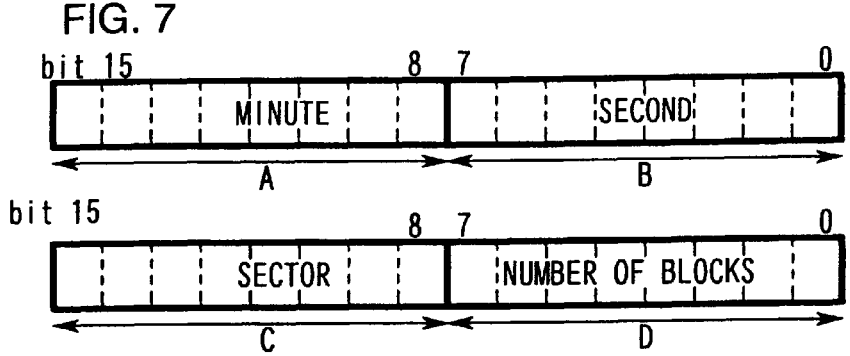

A: DATA STORAGE ADDRESS (MINUTE)
B: DATA STORAGE ADDRESS (SECOND)
C: DATA STORAGE ADDRESS (SECTOR)
D: NUMBER OF CD LOGIC BLOCKS (1 BLOCK = 256 Bytes)

FIG. 8

MESH MANAGEMENT TABLE

| ITEM NO. | ITEM | OFFSET | DATA FORMAT | DATA LENGTH (Word) | REMARKS |
|---|---|---|---|---|---|
| 1 | MESH MANAGEMENT TABLE SIZE | 0 | BINARY | 1 | |
| 2 | NUMBER OF LATITUDINAL DIRECTION MESHES FOR MANAGEMENT | 1 | ↑ | 1 | |
| 3 | NUMBER OF LONGITUDINAL DIRECTION MESHES FOR MANAGEMENT | 2 | ↑ | 1 | |
| 4 | LOWER END LATITUDE (PRIMARY LATITUDE MESH CODE) | 3 | ↑ | 1 | |
| 5 | LEFT END LONGITUDINAL (PRIMARY LONGITUDINAL MESH CODE) | 4 | ↑ | 1 | |
| 6 | FILE MANAGEMENT TABLE CLASSIFICATION | 5 | ↑ | 1 | |
| 7 | FILE MANAGEMENT TABLE | 6 | | | (NOTE 1) |

(NOTE 1) REFER TO THE DESCRIPTION OF THE FILE MANAGEMENT TABLES.

FIG. 9
CLASSIFICATION 0 FILE MANAGEMENT TABLE

| ITEM NO. | ITEM | | OFFSET | DATA FORMAT | DATA LENGTH (Word) | REMARKS |
|---|---|---|---|---|---|---|
| 1 | LOWER END ROW | MESH DATA FRONT END POINTER | 0 | SA | 2 | (NOTE 1) |
| 2 | | LEFT END MESH DATA SIZE | 2 | BS | 1 | LOWER LEFT MESH |
| 3 | | MESH DATA SIZE RIGHT ADJACENT TO ITEM NUMBER 2 | 3 | ↑ | 1 | (NOTE 2) |
| 4 | | MESH DATA SIZE RIGHT ADJACENT TO ITEM NUMBER 3 | 4 | ↑ | 1 | |
| 5 | | MESH DATA SIZE RIGHT ADJACENT TO ITEM NUMBER 4 | 5 | ↑ | 1 | |
| 6 | | MESH DATA SIZE RIGHT ADJACENT TO ITEM NUMBER 5 | 6 | ↑ | 1 | |
| 7 | | MESH DATA SIZE RIGHT ADJACENT TO ITEM NUMBER 6 | 7 | ↑ | 1 | |
| 8 | | ⋮ | | | | |
| 9 | | RIGHT END MESH DATA SIZE | | BS | 1 | LOWER RIGHT MESH |
| 10 | SECOND ROW FROM LOWER END | MESH DATA FRONT END POINTER | | SA | 2 | |
| 11 | | LEFT END MESH DATA SIZE | | BS | 1 | |
| 12 | | MESH DATA SIZE RIGHT ADJACENT TO ITEM NUMBER 11 | | ↑ | 1 | |
| 13 | | MESH DATA SIZE RIGHT ADJACENT TO ITEM NUMBER 12 | | ↑ | 1 | |
| 14 | | MESH DATA SIZE RIGHT ADJACENT TO ITEM NUMBER 13 | | ↑ | 1 | |
| 15 | | MESH DATA SIZE RIGHT ADJACENT TO ITEM NUMBER 14 | | ↑ | 1 | |
| 16 | | MESH DATA SIZE RIGHT ADJACENT TO ITEM NUMBER 15 | | ↑ | 1 | |
| 17 | | ⋮ | | | | |
| 18 | | RIGHT END MESH DATA SIZE | | BS | 1 | |
| 19 | ⋮ | | | | | |
| 20 | UPPER END ROW | MESH DATA FRONT END POINTER | | SA | 2 | |
| 21 | | LEFT END MESH DATA SIZE | | BS | 1 | UPPER LEFT MESH |
| 22 | | MESH DATA SIZE RIGHT ADJACENT TO ITEM NUMBER 21 | | ↑ | 1 | |
| 23 | | MESH DATA SIZE RIGHT ADJACENT TO ITEM NUMBER 22 | | ↑ | 1 | |
| 24 | | MESH DATA SIZE RIGHT ADJACENT TO ITEM NUMBER 23 | | ↑ | 1 | |
| 25 | | MESH DATA SIZE RIGHT ADJACENT TO ITEM NUMBER 24 | | ↑ | 1 | |
| 26 | | MESH DATA SIZE RIGHT ADJACENT TO ITEM NUMBER 25 | | ↑ | 1 | |
| 27 | | ⋮ | | | | |
| 28 | | RIGHT END MESH DATA SIZE | | BS | 1 | UPPER RIGHT MESH |

NOTE 1) SA INDICATES AN ADDRESS ON THE CD-ROM (BINARY DATA FORMAT)
NOTE 2) BS INDICATES THE NUMBER OF CD LOGIC BLOCKS

FIG. 10
CLASSIFICATION 1 FILE MANAGEMENT TABLE

| ITEM NO. | | | ITEM | OFFSET | DATA FORMAT | DATA LENGTH (Word) | REMARKS |
|---|---|---|---|---|---|---|---|
| 1 | LOWER END ROW | | MESH DATA FRONT END POINTER | 0 | SA | 2 | (NOTE 1) |
| 2 | | LEFT END | ROAD MESH DATA SIZE | 2 | BS | 1 | LOWER LEFT MESH |
| 3 | | | BACKGROUND, NAME MESH DATA SIZE | 3 | BBS | 1 | |
| 4 | | RIGHT ADJA-CENT | ROAD MESH DATA SIZE | 4 | BS | 1 | (NOTE 2) |
| 5 | | | BACKGROUND, NAME MESH DATA SIZE | 5 | BBS | 1 | (NOTE 3) |
| 6 | | RIGHT ADJA-CENT | ROAD MESH DATA SIZE | 6 | BS | 1 | |
| 7 | | | BACKGROUND, NAME MESH DATA SIZE | 7 | BBS | 1 | |
| 8 | | ⋮ | | | | | |
| 9 | | RIGHT END | ROAD MESH DATA SIZE | | BS | 1 | LOWER RIGHT MESH |
| 10 | | | BACKGROUND, NAME MESH DATA SIZE | | BBS | 1 | |
| 11 | SECOND ROW FROM LOWER END | | MESH DATA FRONT END POINTER | | SA | 2 | |
| 12 | | LEFT END | ROAD MESH DATA SIZE | | BS | 1 | |
| 13 | | | BACKGROUND, NAME MESH DATA SIZE | | BBS | 1 | |
| 14 | | RIGHT ADJA-CENT | ROAD MESH DATA SIZE | | BS | 1 | |
| 15 | | | BACKGROUND, NAME MESH DATA SIZE | | BBS | 1 | |
| 16 | | RIGHT ADJA-CENT | ROAD MESH DATA SIZE | | BS | 1 | |
| 17 | | | BACKGROUND, NAME MESH DATA SIZE | | BBS | 1 | |
| 18 | | ⋮ | | | | | |
| 19 | | RIGHT END | ROAD MESH DATA SIZE | | BS | 1 | |
| 20 | | | BACKGROUND, NAME MESH DATA SIZE | | BBS | 1 | |
| 21 | ⋮ | | | | | | |
| 22 | UPPER END ROW | | MESH DATA FRONT END POINTER | | SA | 2 | |
| 23 | | LEFT END | ROAD MESH DATA SIZE | | BS | 1 | UPPER LEFT MESH |
| 24 | | | BACKGROUND, NAME MESH DATA SIZE | | BBS | 1 | |
| 25 | | RIGHT ADJA-CENT | ROAD MESH DATA SIZE | | BS | 1 | |
| 26 | | | BACKGROUND, NAME MESH DATA SIZE | | BBS | 1 | |
| 27 | | RIGHT ADJA-CENT | ROAD MESH DATA SIZE | | BS | 1 | |
| 28 | | | BACKGROUND, NAME MESH DATA SIZE | | BBS | 1 | |
| 29 | | ⋮ | | | | | |
| 30 | | RIGHT END | ROAD MESH DATA SIZE | | BS | 1 | UPPER RIGHT MESH |
| 31 | | | BACKGROUND, NAME MESH DATA SIZE | | BBS | 1 | |

NOTE 1) SA INDICATES AN ADDRESS ON THE CD-ROM (BINARY DATA FORMAT)
NOTE 2) BS INDICATES THE NUMBER OF CD LOGIC BLOCKS
NOTE 3) BBS INDICATES THE NUMBER OF CD LOGIC BLOCKS

RELATIONSHIP BETWEEN FILE MANAGEMENT TABLE AND MESH DATA ARRANGEMENT
CLASSIFICATION 0 FILE MANAGEMENT TABLE

RELATIONSHIP BETWEEN FILE MANAGEMENT TABLE AND MESH DATA ARRANGEMENT
CLASSIFICATION 1 FILE MANAGEMENT TABLE

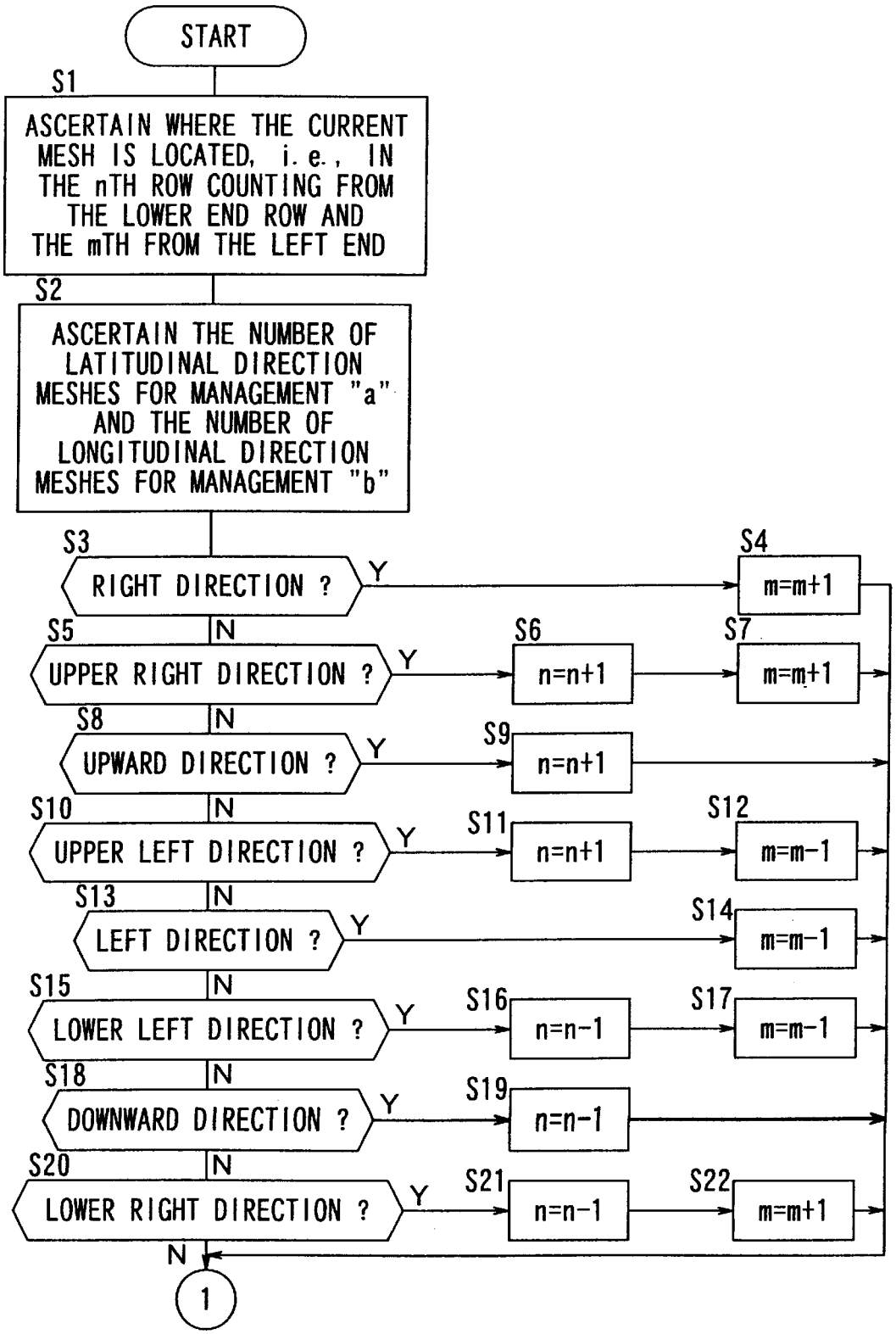

FIG. 14

| UPPER LEFT | UP-WARD | UPPER RIGHT |
|---|---|---|
| LEFT | CURRENT MESH | RIGHT |
| LOWER LEFT | DOWN-WARD | LOWER RIGHT |

FIG. 15

| Q | P | O | N | M |
|---|---|---|---|---|
| R | E | D | C | L |
| S | F | A | B | K |
| T | G | H | I | J |
| U | V | W | X | Y |

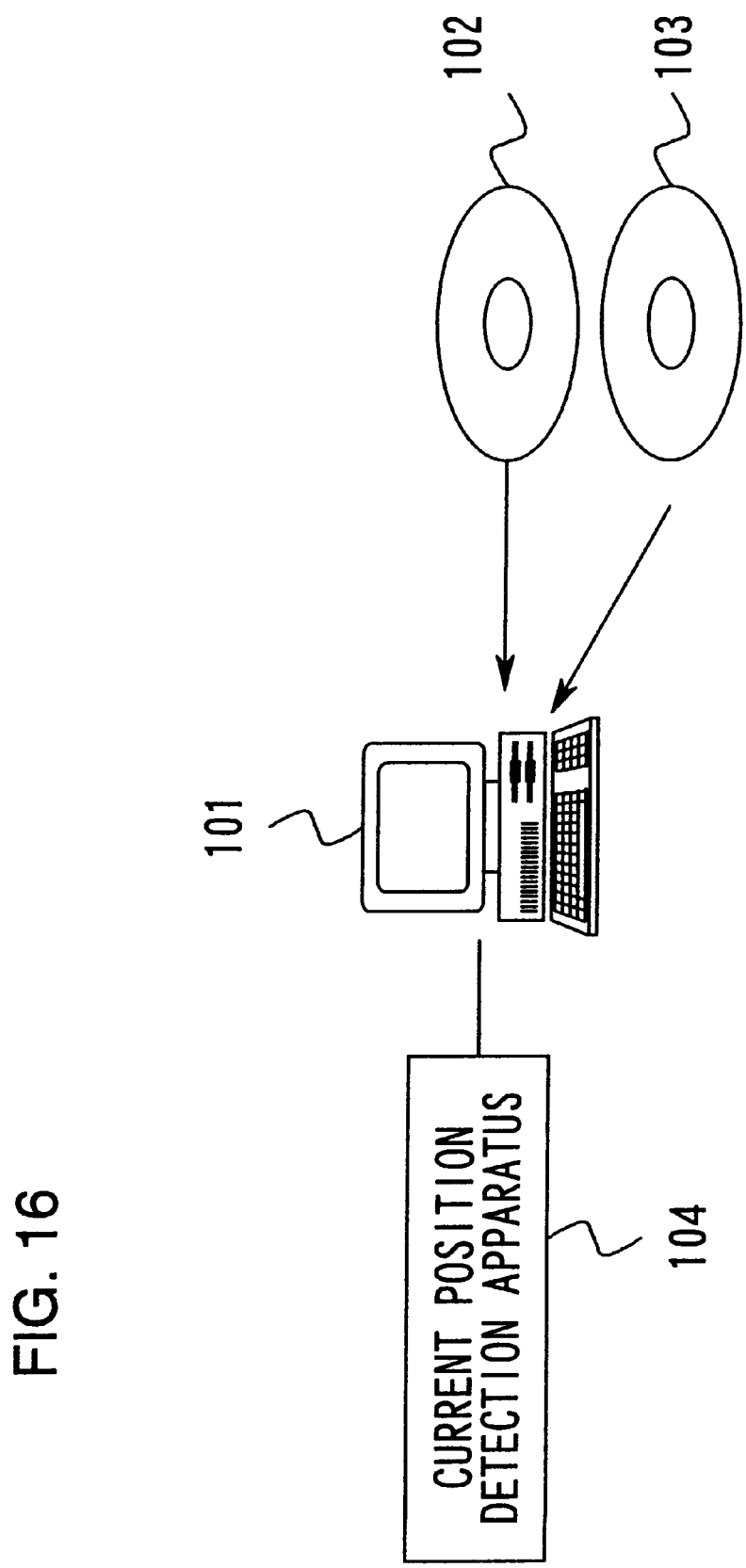

MAP DATABASE APPARATUS

This application is a continuation of PCT Application No. PCT/JP97/04670 filed on Dec. 18, 1997.

TECHNICAL FIELD

The present invention relates to a map database apparatus and a recording medium that are employed in a navigation system or the like.

BACKGROUND ART

Navigation systems for vehicles that are equipped with a function for displaying a roadmap in the vicinity of the vehicle position, a function for accurately detecting the vehicle position through map matching, a function for calculating a recommended route from a point of departure to a destination, a function for implementing route guidance based upon a calculated recommended route and the like exist in the known art. In these navigation systems for vehicles in the prior art, roadmap display data, map matching data, route search data, route guidance data and the like are stored in a map database apparatus such as a single CD-ROM in order to maintain compatibility with existing software and to improve processing speed.

In the case of the map display data, they are normally managed by dividing a given map area into a plurality of portions in order to display the map on a monitor or the like of the navigation system. These divided units are referred to as meshes. FIG. 15 illustrates a map area divided into 25 portions with each mesh assigned with codes A, B, C . . . X and Y. If the map is currently displayed using the data corresponding to the mesh A, the map display data corresponding to the meshes surrounding the mesh A are likely to be needed as the vehicle advances or through a scroll operation performed by the user. In systems in the prior art, management is implemented by providing each mesh with data addresses of the meshes surrounding it and in the case of a CD-ROM, by providing each mesh with sector addresses on the CD-ROM of the meshes surrounding it. For instance, the mesh A holds addresses corresponding to the 8 meshes; B, C, D, E, F, G, H and I that surround it, whereas the mesh B holds addresses corresponding to the 8 meshes; K, L, C, D, A, H, I and J that surround it. Since four bytes are required to express an address in the CD-ROM, a 32-byte area is required at each mesh in order to hold the addresses of the surrounding meshes. The same principle applies to the route search data and the route guidance data.

The great data quantity required in a map database apparatus that stores map display data and the like in order to implement the processing through which data corresponding to surrounding meshes are obtained from a given mesh in this manner, results in the necessity for securing a very large data storage area.

DISCLOSURE OF THE INVENTION

An object of the present invention is to provide a map database apparatus that achieves access to data corresponding to surrounding meshes from a given mesh while requiring only a small volume of data by implementing table management of mesh data.

In order to attain the above object, a map database apparatus according to the present invention is provided in which: meshes that are achieved by dividing a map into a plurality of portions are used as management units; sets of data related to the meshes are stored in a specific order; a management table that manages the sets of data related to the meshes is provided; and the management table has a parameter that makes it possible to determine an access address of a set of data related to a mesh present in a surrounding area of a specific mesh through calculation based upon the specific mesh.

BRIEF DESCRIPTION OF THE DRAWINGS

FIGS. 2A through 2G show the hierarchical structure of the map display data in this embodiment.

FIG. 5 shows a schematic illustration of the relationships among the block management table, the mesh management tables and the actual data, i.e., the mesh data.

FIG. 6 shows a block management table at level 3.

FIG. 7 shows the structure of an address.

FIG. 8 shows contents of a mesh management table.

FIG. 9 shows a classification 0 file management table.

FIG. 10 shows a classification 1 file management table.

FIG. 12 shows a flowchart illustrating the method of ascertaining the address of one of the surrounding meshes from which data are to be obtained next from the address of the current mesh.

FIG. 14 shows the direction of the mesh from which data are to be obtained next from the current mesh.

FIG. 15 shows an illustration of the prior art.

FIG. 16 shows a case in which an navigation system is achieved by a computer.

BEST MODE FOR CARRYING OUT THE INVENTION

Figure 1:
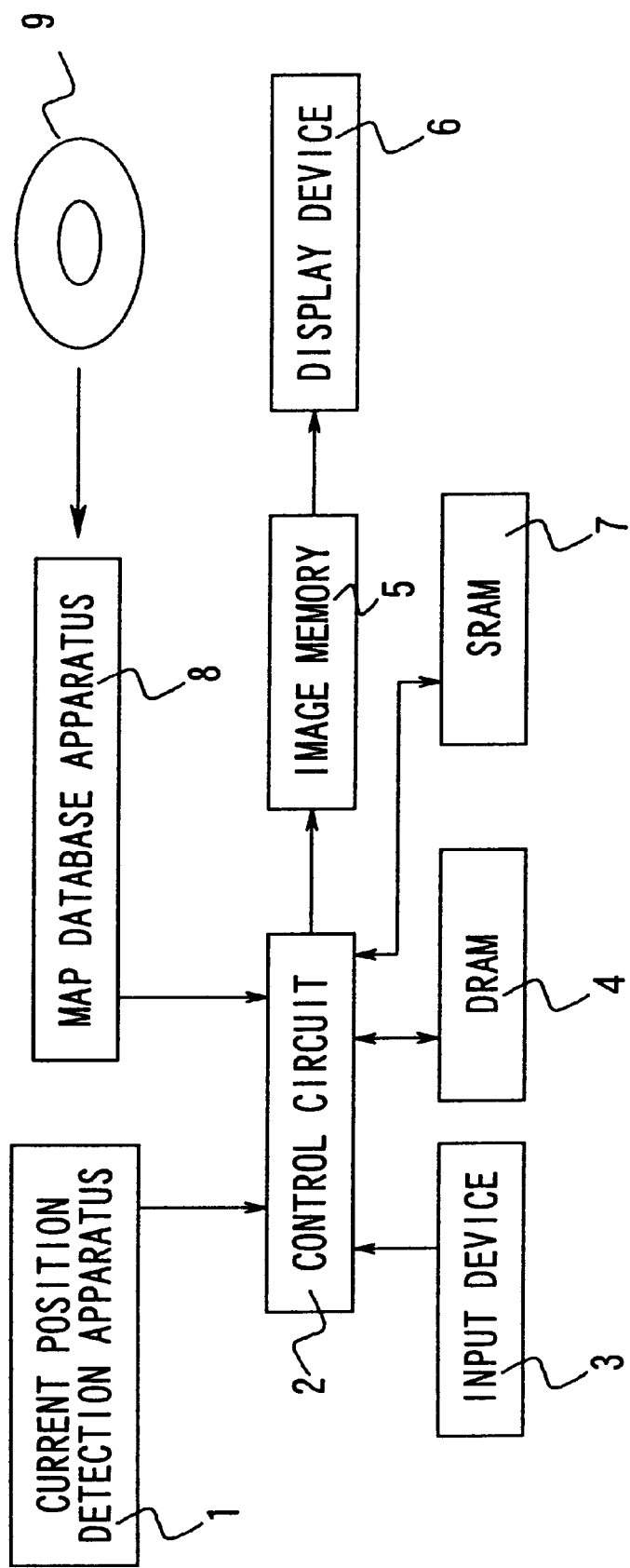
FIG. 1 shows a block diagram of an embodiment of a navigation system for vehicles employing the map database apparatus according to the present invention.

FIG. 1 is a block diagram of an embodiment of a navigation system for vehicles that employs a map database apparatus according to the present invention. In FIG. 1, reference number 1 indicates a current position detection apparatus that detects the current position of a vehicle, which is constituted with, for instance, an azimuth sensor that detects the bearing of the vehicle while traveling, a vehicle speed sensor that detects the speed of the vehicle, a GPS sensor that detects a GPS signal from a GPS (Global Positioning System) satellite and the like.

Reference number 2 indicates a control circuit that controls the entire system and is constituted with a microprocessor and peripheral circuits. Reference number 3 indicates an input device for inputting destinations and the like for vehicles, reference number 4 indicates a DRAM that stores vehicle position information and the like detected by the current position detection apparatus 1, reference number 5 is an image memory that stores image data for display on a display device 6 and image data stored in the image memory 5 are read out as necessary to be displayed on the display device 6. Reference number 7 indicates an SRAM that stores node information, link information and the like on the recommended route calculated by the control circuit 2.

Reference number 8 indicates a map database apparatus that stores various types of data for implementing road map display, route search, route guidance and the like, and in this embodiment, a CD-ROM device is employed. Reference number 9 indicates a recording medium on which the above data are recorded, for example a CD-ROM. When just the map database apparatus is referred to, it includes the recording medium. In the map database apparatus 8, map display data comprising information on road forms, information on road classifications and the like, route guidance data comprising intersection names and the like and route search data comprising branching information and the like that are not directly related to road forms, are stored. The map display data are mainly used when displaying a road map on the display device 6, the route search data are mainly used when calculating a recommended route and the route guidance data are used when guiding a driver or the like through a recommended route that has been calculated.

Since an existing CD-ROM device is employed to constitute the map database apparatus 8 in this embodiment, a brief explanation is given on the data format in the CD-ROM. This type of CD-ROM device was originally developed for music recordings and is formatted with one track formed in a coil on the disk, as is the case with vinyl records. This one track is divided into 2048-byte sectors, and the data are stored and the device is controlled so that data corresponding to 75 sectors per second can be read. As a result, an address that constitutes a storage position of data within the medium is expressed as minute second sector. The beginning of the track at the internal circumference is assigned as sector 0 and the minute second sector is counted up sequentially toward the outside of the coil. Typically, CD-ROM media are available in two sizes, i.e., a 63 minute disk and a 74 minute disk. In a 63 minute CD-ROM disk, for instance, approximately 580 megabytes of data, i.e., 580,608,000 bytes calculated through 63 minutes×60 seconds× 75×2048 bytes, can be stored. In this embodiment, one sector is further divided into 8 blocks and the 256 bytes corresponding to one block is used as the minimum unit of data. Consequently, an address of data within the CD-ROM in this embodiment is expressed with minute second sector block. Since the blocks referred to here are different from the blocks in the map display data to be explained later, these blocks are hereafter referred to as CD logic blocks.

Next, the structure of the map display data stored in the map database apparatus 8 and the method for accessing the data are explained. Since the structures and access methods in regard to the other data, i.e., the route guidance data and the route search data are based upon a similar concept, their explanation is omitted.

Structure of Map Display Data

FIGS. 2A through 2G illustrate the hierarchical structure of the map display data in this embodiment. In this embodiment, data are divided into 7 levels at varying scales, with the level at the most detailed scale assigned as level 0 and the level corresponding to the largest area map assigned as level 6. A concept constituted of blocks and meshes is adopted to manage the map display data at each level. The blocks, as referred to in this context, are conceptual blocks which are different from the CD logic blocks achieved by dividing each sector in the CD-ROM into 8 portions. Simply put, a map is divided into a plurality of portions at each level, with the minimum unit resulting from the division at a given level referred to as a mesh at that level and a range constituted of a group of meshes constituting a block.

Now, the terms used in the tables at the individual levels shown in FIGS. 2A–2G are explained. The block management unit indicates the range over which management is implemented through one block at a given level, and at level 6 in FIG. 2A, 1600 primary meshes (to be detailed later) constitute one block unit. The mesh management unit refers to the range over which management is implemented through one mesh in the group of meshes constituting a block. At level 6, since there is only one mesh in one block, the range corresponding to the block, i.e., 1600 primary meshes, constitutes the management unit for one mesh. The number of meshes for management refers to the number of meshes in one block and at level 6, the number of meshes for management is one. The number of blocks for management indicates the total number of blocks in the data at a given level. At level 6, which represents the map of Japan in this embodiment, there is only one block, since the entire map of Japan shown in FIG. 3 is represented in one block.

Next, the same concept is adopted to examine level 5 shown in FIG. 2B. At level 5, one mesh at level 6 is divided into 25 portions to manage the data through 25 meshes. In other words, the mesh management unit at level 5 for primary meshes is 64 primary meshes, which is ¹/₂₅ of the 1600 primary meshes. There are 25 meshes present in one block and the entire country of Japan can be expressed with these 25 meshes, requiring only one block. In other words, at level 5, while the number of blocks is the same as that at level 6, i.e., one, there are 25 meshes present within the block, unlike at level 6 in which there is only one mesh.

Figure 3:
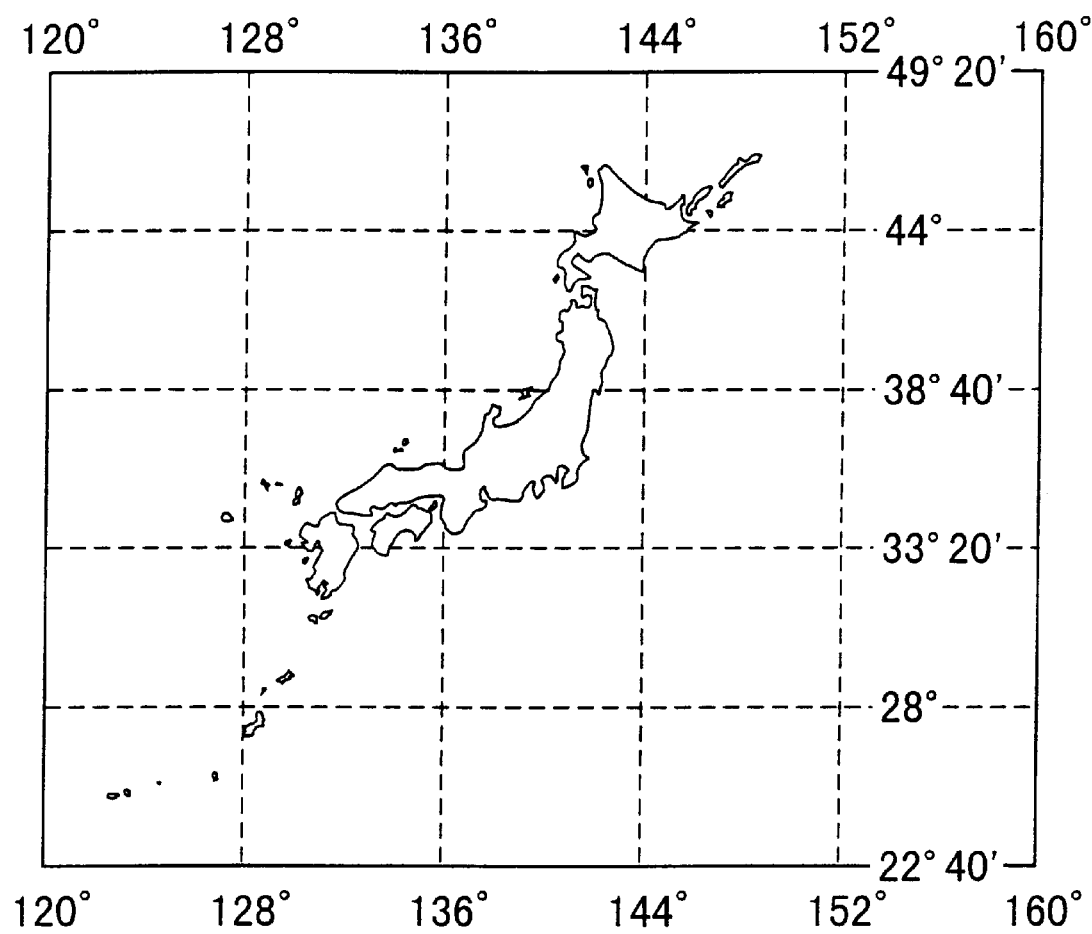
FIG. 3 shows a map of the entire country of Japan.

The contents of the above explanation are elaborated in further detail in reference to FIG. 3. FIG. 3 shows the map of Japan in its entirety. The range over which data are extant in this embodiment is 120 degrees east longitude to 160 degrees east longitude in the east/west direction and from 22 degrees 40 minutes north latitude to 49 degrees 20 minutes north latitude in north/south direction in FIG. 3. The range of one block at level 6 corresponds to the range of 120 degrees east longitude to 160 degrees east longitude and 22 degrees 40 minutes north latitude to 49 degrees 20 minutes north latitude and one mesh corresponds to the same range. At level 5, this range is divided into 25 portions and one of the 25 portions corresponds to one mesh. The 25 meshes constitute one block, with one block representing the range from 120 degrees east longitude to 160 degrees east longitude and from 22 degrees 40 minutes north latitude to 49 degrees 20 minutes north latitude.

Figure 4:
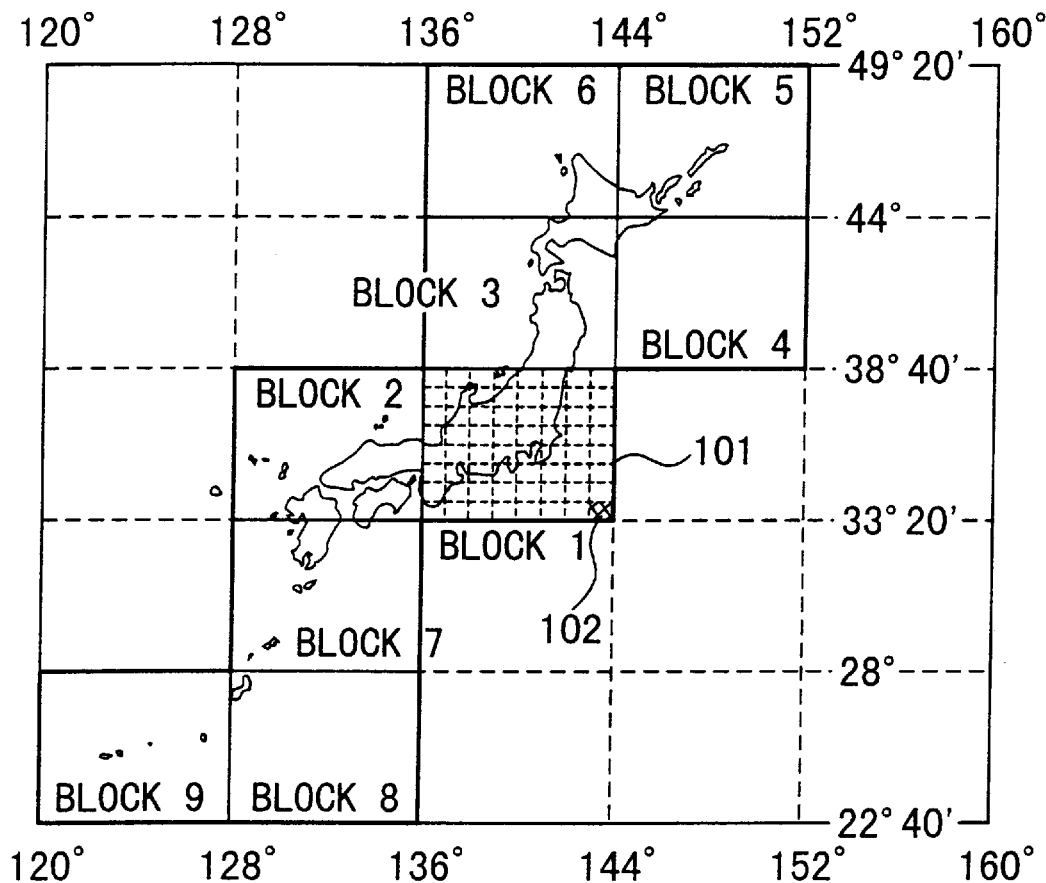
FIG. 4 illustrates details of level 3 data.

The map display data descend through lower hierarchical layers sequentially in a hierarchy based upon this concept to manage more detailed map display data. FIG. 4 illustrates the contents of the level 3 data. In FIG. 4, the range indicated with reference number 101, which is one of the 25 portions achieved by dividing the entire country of Japan into 25 portions is further divided into 64 portions. In this embodiment, the primary mesh mentioned earlier refers to one of these 64 portions. Reference number 102 indicates one primary mesh. At level 3, one of the units achieved by dividing the primary mesh into four portions is assigned as the mesh management unit. Namely, one mesh at level 3 is ¼ of a primary mesh, and a group of 256 meshes at level 3 (64 primary meshes) constitutes a management unit of one block at level 3. Nine such blocks are required to represent the entire country of Japan, as shown in FIG. 4. With the block indicated with the reference number 101 assigned as block 1, the blocks are assigned numbers sequentially up to block 9. No data corresponding to the sea areas are provided since they are not necessary. To sum up the explanation above, at level 3, ¼ of a primary mesh constitutes one mesh management unit, with 256 meshes present in one block and 9 such blocks are put together to store the data representing the entire country of Japan. The same principle applies to the data at levels 2~0.

It is to be noted that, while the range covered by one mesh varies at the different levels, the primary meshes explained earlier have a fixed size uniformly determined in this embodiment regardless of the level. In addition, the factor 2 (secondary) meshes, the factor 2.5 meshes and the factor 3.5 meshes shown at levels 0~2 in FIG. 2, too, have fixed sizes that are determined regardless of the level. The factor 2 mesh is determined by dividing the primary mesh into 64 portions, the factor 2.5 mesh is determined by dividing a factor 2 mesh into 16 portions (1/1024 of a primary mesh) and the factor 3.5 mesh is determined by dividing a factor 2.5 mesh into 16 portions (1/16384 of a primary mesh).

Next, an explanation is given on how blocks and meshes are managed and stored on a CD-ROM in reference to the level 3 data explained above. Simply put, the blocks are managed through a block management table, and the mesh data that constitute the map display data within each block are managed through a mesh management table. The management at the mesh management table is implemented on the basis that the mesh data are arranged in a specific order, as detailed later. The following is a detailed explanation of their contents.

FIG. 5 schematically illustrates the relationships among the block management table, the mesh management table and the actual data, i.e., the mesh data. First, the figure shows that there is one block management table for the data at level x. Information related to all the blocks at the relevant level is provided at the block management table. For instance, at level 3 in FIG. 2D, nine sets of block information are provided in correspondence to the nine blocks, whereas at level 2 in FIG. 2E, since one block at level 3 is managed as four blocks and, consequently, there are 9×4=36 blocks, 36 sets of block information are provided. At level 1 in FIG. 2F, 576 sets of block information are provided in correspondence to 9×4×16=576 blocks, and at level 0 in FIG. 2G, 9216 sets of block information are provided to correspond to 9×4×16×16=9,216 blocks. FIG. 5 also shows that there is one mesh management table provided for each block. In a mesh management table, size information on the size of each set of mesh data and the like are stored on the premise that, as detailed later, the mesh data are stored in an arrangement conforming to a specific regular order. An address for accessing a set of mesh data and the like are calculated at the mesh management table.

FIG. 6 shows the block management table at level 3. Under item number 1 "block management table size," the data size of the data in the block management table (item numbers 1~23) is stored. The size is expressed as the number of words, with each word constituted of 2 bytes. Under item number 2 "number of block management information sets," the number of sets of block management information within the block management table is stored. At level 3, the number 9 is stored since, as illustrated in FIG. 4, there are 9 blocks. Under item numbers 3~6, values that indicate the range corresponding to this block on the map are stored as latitude and longitude. It is to be noted that the values stored are achieved by subtracting 100 from the actual longitude and by multiplying the actual latitude by 3/2. For instance, 36 is stored to indicate 136 degrees east longitude and (33+20/60)× (3/2)=50 is stored to indicate 33 degrees 20 minutes north latitude. Item number 7, "pointer to mesh management table" refers to the address on the CD-ROM where the mesh management table is stored. FIG. 7 shows the structure of this address. As explained earlier, in this embodiment, an address on the CD-ROM is expressed as minute second sector CD logic block. FIG. 6 shows that there are a total of 9 blocks at level 3 in the block management table.

FIG. 8 shows the contents of a mesh management table that is accessed through the "pointer to mesh management table" at the block management table. Under item number 1 "mesh management table size," the data size of the data at the mesh management table (item numbers 1 through 7) is stored. The size is expressed as the number of words. Under item number 2 "number of latitudinal direction meshes for management," the number of meshes in the latitudinal direction that are managed at this table is stored. Under item number 3 "number of longitudinal direction meshes for management," the number of meshes in the longitudinal direction that are managed at this table is stored. In block 1 in FIG. 4, the number 16 is set for the "number of latitudinal direction meshes for management" since there are 16 meshes (8 primary meshes) in the north/south direction and 16 is also set for the "number of longitudinal direction meshes for management" since there are also 16 meshes (8 primary meshes) in the east/west direction. Under item numbers 4 and 5 "lower end latitude" and "left end longitude" respectively, the position of the lower left mesh, which is comprised in a file management table, to be detailed next, is indicated. For the latitude and the longitude, values determined through the calculation explained earlier are stored. It is to be noted that the latitude that indicates the position of a mesh refers to the latitude at the lower side (toward the south) of the mesh, and the longitude indicating the mesh position refers to the longitude at the left side (toward the west) of the mesh. Under item number 6 "file management table classification," the type of the file management table is indicated. For instance, 0 indicates that there are only background data, and 1 indicates that there are background data, road data and name data. At the file management table under item number 7, information such as the sizes of individual meshes, which is to be explained next, is stored.

FIG. 9 shows in detail a file management table when its classification is 0. In the case of block 1 shown in FIG. 4, the data corresponding to the 256 meshes present in block 1 are managed over 16 rows from the lower end row to the upper end row with an arrangement in the west to east direction constituting each row. Within each row, the mesh data sizes of the data at the meshes are sequentially stored from the left end (west end) to the right end (east end). In the "mesh data front end pointer" in FIG. 9, the address of the mesh data at the left end in each row on the CD-ROM is stored. If no mesh data are present in a given row, FFFFFFFF (16) is set in the mesh data front end pointer. Addressing on the CD-ROM has been explained earlier. Following the mesh data front end pointer, the mesh data sizes of the data in the individual meshes are stored sequentially starting with the mesh at the left end. A mesh data size is expressed as the number of CD logic blocks. The arrangement of the mesh data sizes described above represents the order in which that the mesh data are arranged on the CD-ROM.

FIG. 10 illustrates in detail a file management table when its classification is 1. Since the road data are stored separately from the background/name data in the mesh data in classification 1, their respective data sizes are stored. The same principle as that of a classification 0 file management table is adopted here.

Figure 11A:
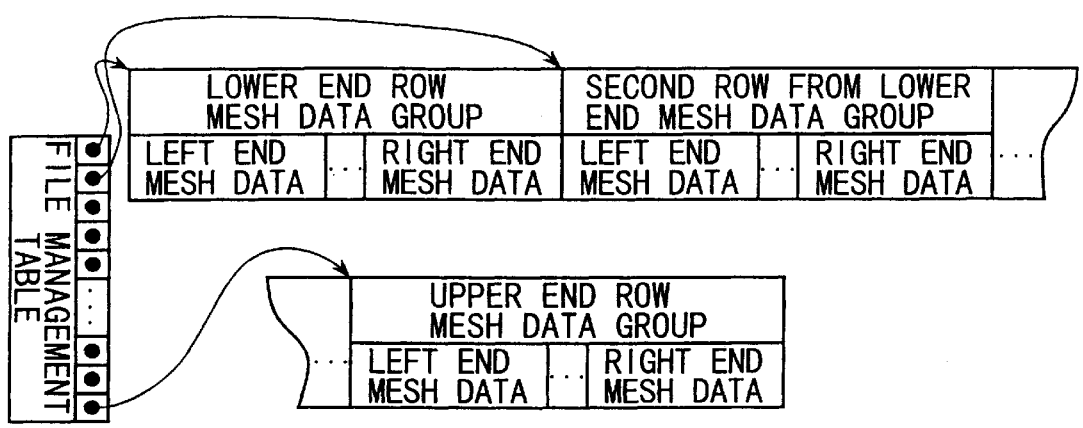
FIGS. 11A and 11B show the relationship between a file management table and the arrangement of mesh data.
Figure 11B:
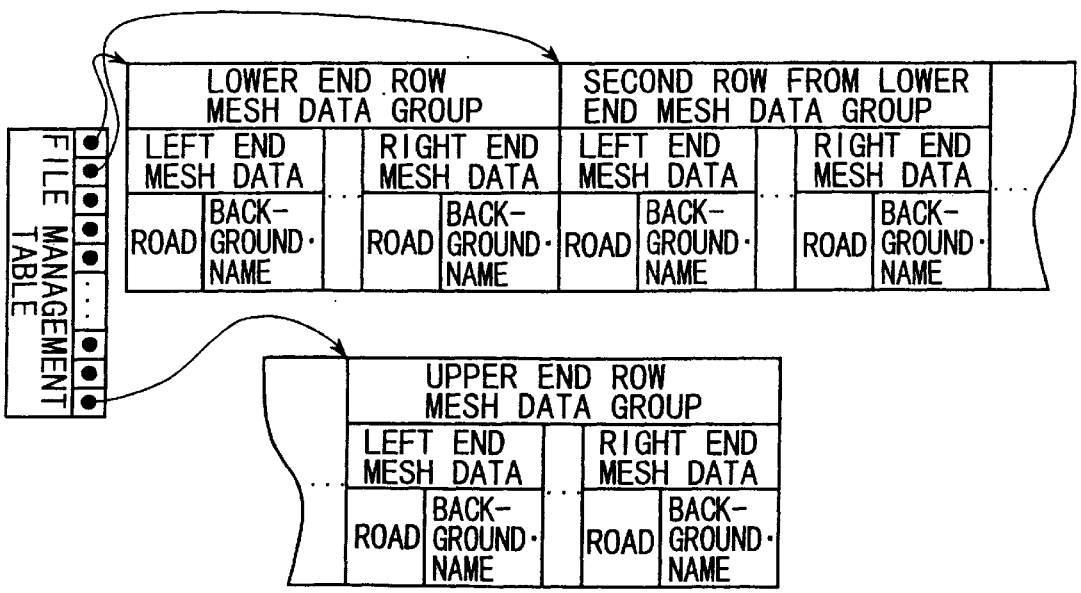

FIG. 11 illustrates the relationship between a file management table and the arrangement of mesh data, with FIG. 11A presenting a classification 0 file management table and FIG. 11B presenting a classification 1 file management table.

Method for Accessing Meshes

Figure 13:
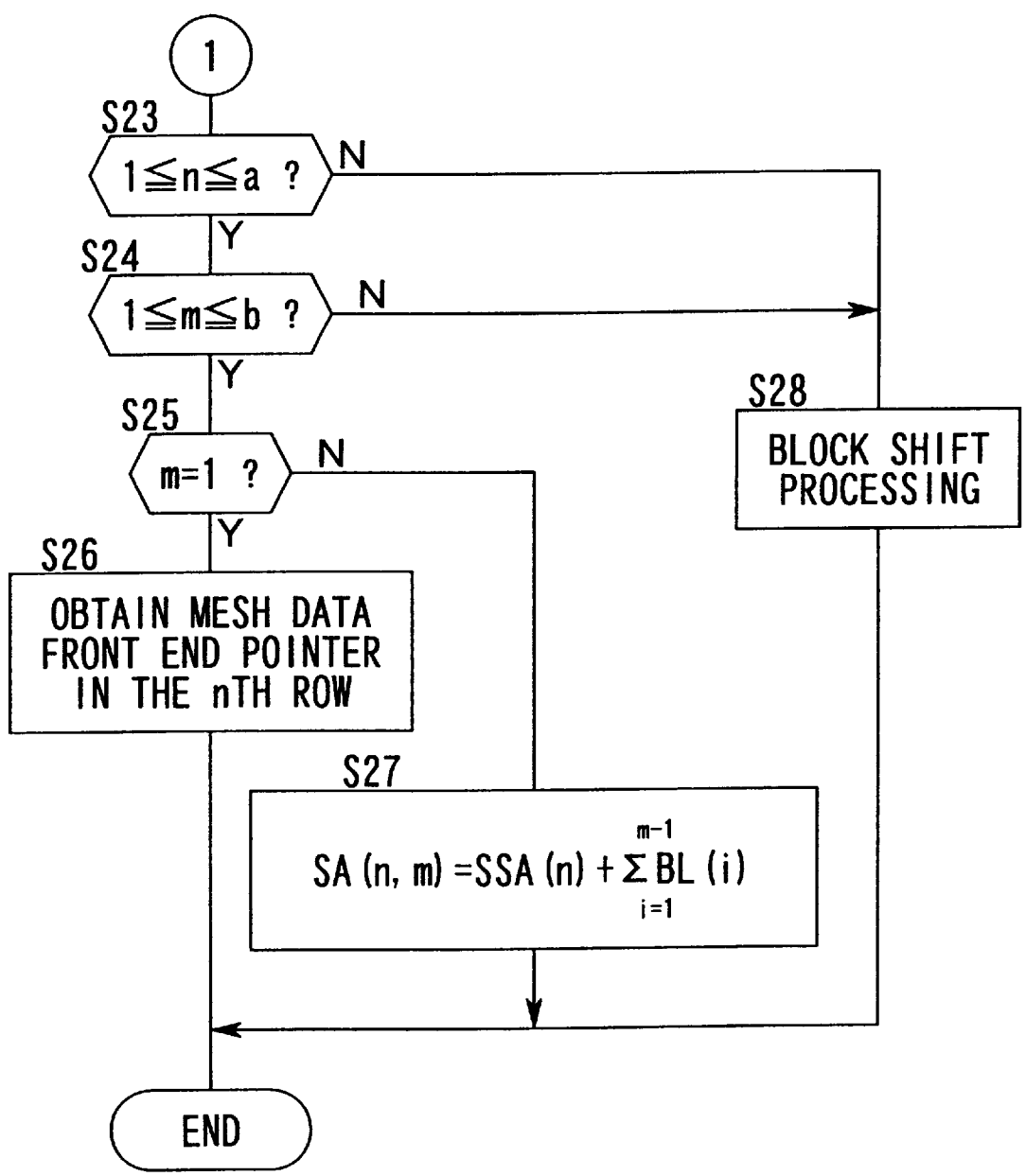
FIG. 13 shows a flowchart continuing from FIG. 12.

Next, the method for accessing mesh data corresponding to surrounding meshes from a given mesh in the map display data stored on a CD-ROM as described earlier is explained. FIGS. 12 and 13 present a flowchart that illustrates how the address of one of the surrounding meshes, from which data are to be obtained next, is determined from the address of the current mesh. FIG. 14 shows the direction of the mesh from which data are to be obtained next from the current mesh. This flowchart starts on the premise that the position of the current mesh within the block has already been ascertained, i.e., in which row the current mesh is located counting from the lower end row and where within the row, counting from the left end, the current mesh is located. In step S1, it is established that the current mesh is located in the nth row counting from the lower end row within the block and that the current mesh is the mth mesh from the left end within the row. If the current mesh is located in the lower end row, n=1 and if it is at the left end, m=1. In step S2, the number of latitudinal direction meshes for management "a" and the number of longitudinal direction meshes for management "b" are obtained from the mesh management table.

In step S3, a decision is made as to whether or not the mesh from which data are to be obtained next is located in the right direction. If it is located in the right direction, 1 is added to m in step S4 before the operation proceeds to step S23.

In step S5, a decision is made as to whether or not the mesh from which data are to be obtained next is located in the upper right direction. If it is located in the upper right direction, 1 is added to n in step S6 and 1 is added to m in step S7 before the operation proceeds to step S23. In step S8, a decision is made as to whether or not the mesh from which data are to be obtained next is located in the upward direction. If it is located in the upward direction, 1 is added to n in step S9 before the operation proceeds to step S23. In step S10, a decision is made as to whether or not the mesh from which data are to be obtained next is located in the upper left direction. If it is located in the upper left direction, 1 is added to n in step S11 and 1 is subtracted from m in step S12 before the operation proceeds to step S23. In step S13, a decision is made as to whether or not the mesh from which data are to be obtained next is located in the left direction. If it is located in the left direction, 1 is subtracted from m in step S14 before the operation proceeds to step S23. In step S15, a decision is made as to whether or not the mesh from which data are to be obtained next is located in the lower left direction. If it is located in the lower left direction, 1 is subtracted from n in step S16 and 1 is subtracted from m in step S17 before the operation proceeds to step S23. In step S18, a decision is made as to whether or not the mesh from which data are to be obtained next is located in the downward direction. If it is located in the downward direction, 1 is subtracted from n in step S19 before the operation proceeds to step S23. In step S20, a decision is made as to whether or not the mesh from which data are to be obtained next is located in the lower right direction. If it is located in the lower right direction, 1 is subtracted from n in step S21 and 1 is added to m in step S22 before the operation proceeds to step S23.

It is to be noted that the direction of the mesh from which data are to be obtained next is determined based upon the direction in which the current vehicle position is advancing, the direction in which the operator is performing a scroll operation on the screen or the like.

In step S23 in FIG. 13, a decision is made as to whether or not n is equal to or greater than 1 and also whether or not n is equal to or smaller than "a". In other words, a decision is made as to whether or not the mesh is located within the range of the relevant block in the latitudinal direction. If it is decided that the mesh is located within the range, the operation proceeds to step S24, in which a decision is made as to whether or not m is equal to or greater than 1 and m is equal to or smaller than "b". Thus, a decision is made as to whether or not the mesh is located within the range of the relevant block in the longitudinal direction. If it is decided that the mesh is within the range in step S24, the operation proceeds to step S25. In step S25, a decision is made as to whether or not m=1 is true. If m=1, it means that the mesh is located at the left end in the nth row, and the operation proceeds to step S26, in which the mesh data front end pointer in the nth row is obtained to set it as the address of the mesh to be accessed next, before ending the processing. If m=1 is not true, the operation proceeds to step S27 to calculate the address of the mesh to be accessed next through the formula presented in numerical expression 1. In numerical expression 1, SA(n, m) represents the address of the mesh that is to be accessed next, i.e., the mth mesh in the nth row, SSA(n) represents the mesh data front end pointer in the nth row and BL(i) represents the mesh data size of the data in the ith mesh counting from the left end in the nth row.

$$SA(n, m) = SSA(n) + \sum_{i=1}^{m-1} BL(i)$$

If n is determined to be outside the range in step S23 or if m is determined to be outside the range in step S24, the operation proceeds to step S28 to perform block shift processing. The operation is performed in the following manner in the block shift processing in step S28. If n=0 and $1 \leq m \leq b$, the operation proceeds to process the adjacent block in the downward direction, and the address of the mth mesh in the upper end row in the block is obtained through calculation using numerical expression 1. If n=0 and m=b+1, the operation proceeds to process the adjacent block in the lower right direction to obtain the address of the first mesh in the upper end row in the block, i.e., the mesh data front end pointer. If n=0 and m=0, the operation proceeds to process the adjacent block in the lower left direction, and the address of the mesh at the right end in the upper end row in the block is obtained through calculation using numerical expression 1. If n=a+1 and $1 \leq m \leq b$, the operation proceeds to process the adjacent block in the upward direction to obtain the address of the mth mesh in the lower end row in the block through calculation using numerical expression 1. If n=a+1 and m=b+1, the operation proceeds to process the adjacent block in the upper right direction to obtain the address of the first mesh in the lower end row in the block, i.e., the mesh data front end pointer. If n=a+1 and m=0, the operation proceeds to process the adjacent block in the upper left direction to obtain the address of the mesh at the right end in the lower end row of the block through calculation using numerical expression 1. If $1 \leq n \leq a$ and m=b+1, the operation proceeds to process the adjacent block in the right direction to obtain the address of the first mesh in the nth row in the block, i.e., the mesh data front end pointer. If $1 \leq n \leq a$ and m=0, the operation proceeds to process the adjacent block in the left direction to obtain the address of the mesh at the right end in the nth row in the block through calculation using numerical expression 1. In the block shift processing described above, the decision making as to which block is, for instance, the adjacent block in the right direction, is performed using latitude/longitude data for the individual blocks at the block management table.

INDUSTRIAL APPLICABILITY

When the address of the mesh from which the data are to be obtained next is ascertained as described above, the CD-ROM device is accessed with the address to obtain the mesh data. In this embodiment, since the address of the mesh that is to be accessed next can be ascertained by performing calculation or the like through the block management table and the mesh management table, it is not necessary to hold the addresses of all the surrounding meshes at each mesh as in the prior art, thereby achieving a reduction in the data volume.

It is to be noted that while, in this embodiment, the map database apparatus 8 includes a CD-ROM medium and a drive device, the present invention is not limited to this structure. If the CD-ROM medium and the CD-ROM drive device are regarded as separate entities, the CD-ROM medium constitutes the map database apparatus according to the present invention. In addition, the map database apparatus 8 is not necessarily constituted of a CD-ROM device. Any device that can be used as a database apparatus for maps and the like in a navigation system, such as a floppy disk device, a hard disk device, a magneto-optical disk device or a memory card may be used.

In the above embodiment, an example of a map navigation system for vehicles is shown in FIG. 1. However the invention is not limited in this respect. For example, as shown in FIG. 16, a control program may be read from a recording medium mounting the control program of a navigation system in a computer 101 such as a personal computer. By executing the control program, it is possible to construct a equivalent system as the map navigation system for vehicles in the present embodiment. In this case, a map data base shown in the present embodiment may be read from the recording medium 103. Furthermore necessary devices to construct a navigation system such as a current position detection apparatus 104 may be connected to an outer port of the computer 101.

What is claimed is:

1. A map database apparatus in which
    meshes that are achieved by dividing a map into a plurality of portions are used as management units, comprising:
    sets of data related to said meshes that are stored in a specific order; and
    a management table that manages said sets of data related to said meshes and has a parameter that makes it possible to determine an access address of a set of data related to a mesh present in a surrounding area of a specific mesh through calculation based upon said specific mesh.

2. A map database apparatus according to claim 1, wherein:
    said parameter corresponds to data sizes of said sets of data related to said meshes.

3. A map database apparatus according to claim 1, wherein:
    said map is divided longitudinally and laterally into a matrix;
    said sets of data related to said meshes are stored in an order in which said sets of data related to said meshes are arranged in a row direction; and
    said parameter comprises an address of a mesh positioned at a front end of a row and data sizes of sets of data related to meshes arranged in said row.

4. A recording medium recording a map database in which:
    meshes that are achieved by dividing a map into a plurality of portions are used as management units;
    sets of data related to said meshes are stored in a specific order;
    a management table that manages said sets of data related to said meshes is provided; and
    said management table has a parameter that makes it possible to determine an access address of a set of data related to a mesh present in a surrounding area of a specific mesh through calculation based upon said specific mesh.

5. A navigation apparatus, comprising:
    a map database device in which meshes that are achieved by dividing a map into a plurality of portions are used as management units, sets of data related to said meshes are stored in a specific order, a management table that manages said sets of data related to said meshes is provided, and said management table has a parameter that makes it possible to determine an access address of a set of data related to a mesh present in a surrounding area of a specific mesh through calculation based upon said specific mesh; and
    a control device that performs route searching and controls a monitor to display a road map and a result of route searching by using database in said map database device.

6. A map database apparatus according to claim 1, wherein:
    said map is divided longitudinally and laterally into a matrix;
    said management table is constructed so that said management table corresponds to said matrix of meshes divided longitudinally and laterally and a mesh present in a surrounding area of a specific mesh can be recognized based upon information related to said matrix in said management table.

7. A navigation apparatus according to claim 5, wherein:
    said map is divided longitudinally and laterally into a matrix;
    said management table is constructed so that said management table corresponds to said matrix of meshes divided longitudinally and laterally and a mesh present in a surrounding area of a specific mesh can be recognized based upon information related to said matrix in said management table; and
    said control device recognizes the mesh present in a surrounding area of said specific mesh based upon said information related to said matrix in said management table, obtains a parameter of said recognized mesh from said management table, and determines an access address of a set of data related to said recognized through calculation.

* * * * *